Feb. 4, 1969  N. FRANTZIS  3,425,920
ELECTROLYTIC METHOD OF REGENERATING ORGANIC ACID
CLEANING SOLUTION FOR FERROUS METALS
Filed July 1, 1964

INVENTOR.
NICHOLAS FRANTZIS
BY
Millman and Jacobs
ATTORNEYS 3,425,920
ELECTROLYTIC METHOD OF REGENERATING ORGANIC ACID CLEANING SOLUTION FOR FERROUS METALS
Nicholas Frantzis, 217B Haddon Hills Apartments, Haddonfield, N.J. 08033
Filed July 1, 1964, Ser. No. 379,502
U.S. Cl. 204—145  11 Claims
Int. Cl. C23g *1/08*

ABSTRACT OF THE DISCLOSURE

A process of cleaning ferrous metals employs an electrolyte consisting of citric or tartaric acid. The citric and tartaric acids are regenerated by another electrolytic process, and the regenerated solution is recycled for further use in removing the oxide deposits.

---

This invention relates to the cleaning of ferrous metals with aqueous solutions of organic acids or salts thereof and more particularly with an economical method of regenerating these cleaning solutions.

The removal of rust, oxide scale and corrosion products from ferrous metals, such as iron, steel and other ferrous alloys, by means of organic acids, such as citric and tartaric acids and ammonium salts thereof, is well known. Citric and tartaric acids ionize in water to form hydrogen ions and citrate and tartrate ions in equilibrium with the undissociated acids. While rust is a complex material thought to be $Fe_3O_4$, it behaves like a ferrous salt and in an aqueous citric or tartaric acid solution the ferrous ions combine by chelation with the citrate or tartrate ions to form soluble ferrous citrate or tartrate. As the degree of ionization of the ferrous citrate or tartrate is less than that of citric or tartaric acid, the citrate or tartrate ions are removed as the organic ferrous compound forms causing the acid to ionize further and thereby provide further citrate or tartrate ions for combination with the iron oxides. In due course, however, the citrate or tartrate ions are depleted, i.e. tied up in the ferrous citrate or tartrate, and the solubilizing of the rust ceases necessitating the discarding of the cleaning solution and its replacement with new material. This requirement for frequent replacement of the citric and tartaric acids places an expensive limitation on the cleaning process.

It is the primary object of this invention to overcome this limitation by regenerating the depleted citric and tartaric acids electrolytically so that the solutions can be used effectively a plurality of times before they must be discarded.

Figure 1:
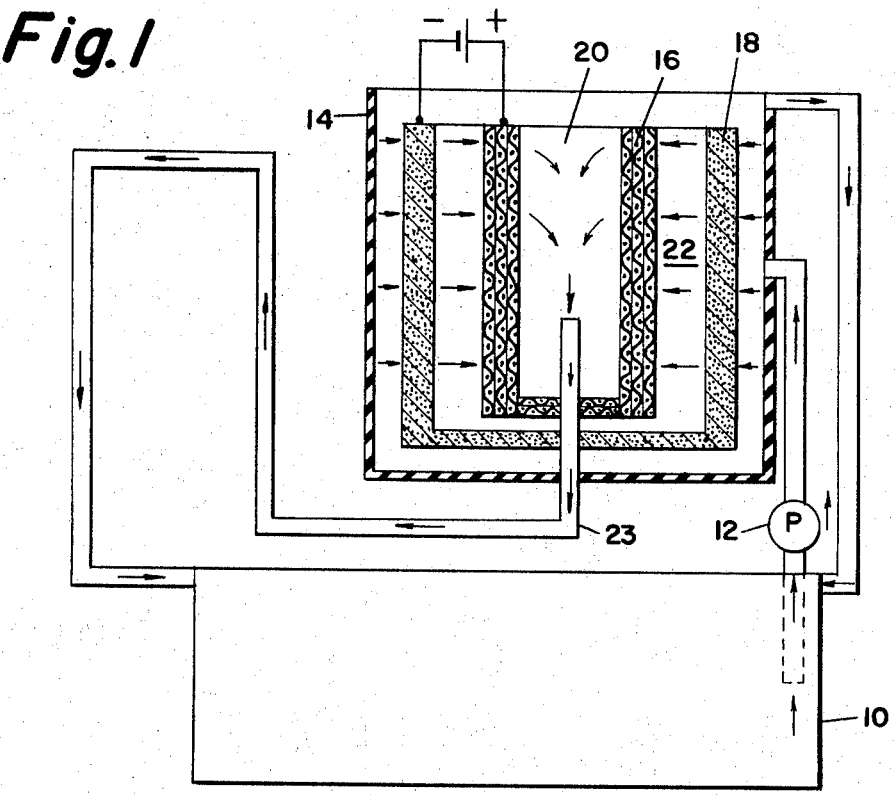
Figure 2:
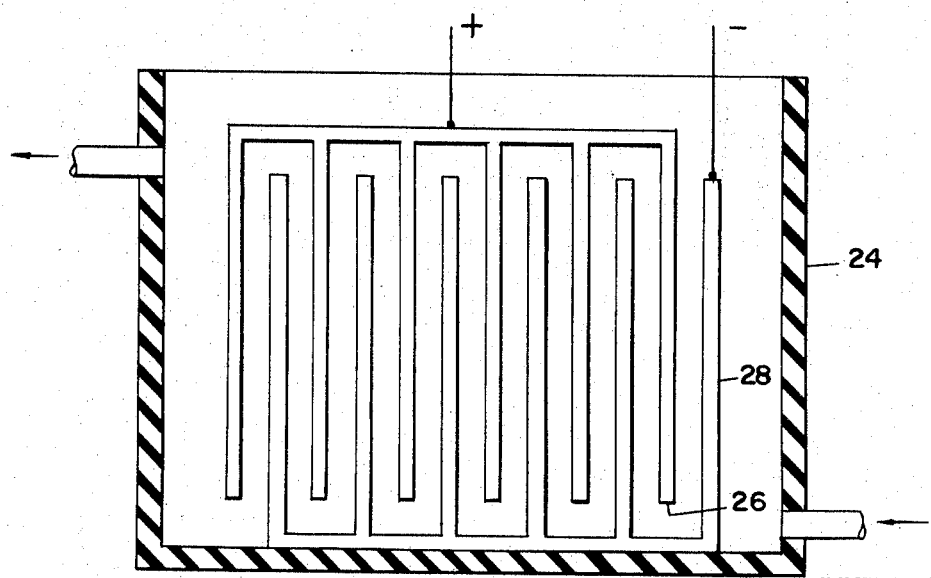

The details of the present process will be described in conjunction with the accompanying drawings illustrating two types of preferred apparatus. FIG. 1 is a diagrammatic view, partly in section, of continuous processing apparatus employing porous anodes and cathodes and FIG. 2 is a diagrammatic view of a plate-type electrolytic cell. While the process will be described in connection with citric acid, it will be understood that it applies as well to tartaric acid.

Aqueous solutions of citric acid with pH's of 2 to 6 can be used to effectively clean ferrous metals, the preferred solution being 10% having a pH of 3.3 to 3.8. The solution is retained in a tank 10 into which the degreased metal to be cleaned is immersed. A gallon of such a solution will effectively de-rust about 40 square feet of steel in about 6–8 hours, i.e. before precipitation occurs. The solution, containing hydrogen, hydroxyl, ferrous, and citrate ions and a relatively large concentration of undissociated ferrous citrate is circulated via a pump 12 to a preferably cylindrical container 14 serving as an electrolytic cell. The anode 16 and cathode 18 are connected to a source of DC current and are also preferably cylindrical and concentrically arranged and spaced in the container thereby forming, in effect, an inner anode compartment 20 and an outer cathode compartment 22.

The anode 16 is porous and is preferably made of a grid of platinum plated titanium or other inert metals. The cathode 18 is also porous and is preferably made of a grid of nitric acid-passivated steel to permit the deposited iron to be readily removed and thereby render the cathode re-usable. During electrolysis, the ferrous ions migrate to the cathode where they gain electrons and plate out as metallic iron. This causes more undissociated ferrous citrate to ionize thereby increasing the concentration of the citrate ion and producing more ferrous ions for plating out at the cathode. It is believed that the hydroxyl ions derived from the dissociation of water lose electrons at the anode to form water and hydrogen ions, the citrate ions remaining substantially unchanged. Thus, the electrolysis of the depleted solution acts to lower its pH, increase the concentration of the citrate ion and remove most of the ferrous ions. The regenerated solution in the anode compartment 20 is recycled via return pipe 22 to the treating tank 10 for re-use.

It was found that by spacing the electrodes apart about 5 inches and using a current density of 2–15 a.s.f., the solution would be regenerated, as measured by the plating rate and the restoration of the solution to its original pH of 3.5, in 6 to 12 hours whereas with the same spacing of the electrodes, a current density of 30–50 a.s.f. accomplished the same result in 2 to 3 hours. Above 50 a.s.f. oxygen will form at the anode and below 2 a.s.f. the regeneration process will be too slow to be practical. The preferred current density was found to be 15–30 a.s.f. which gives good speed of regeneration without danger of oxygen formation at the anode. It was also found that a regenerated citric acid solution with a pH above 6 could not be effectively re-used. Employing this, therefore, as a measure of the end point of the regeneration process, the process with the parameters mentioned herein could be effectively re-used to clean ferrous metals 5–10 times.

An alternative apparatus is shown in FIG. 2. Here the cell or container 24 is preferably rectangular, the anodes 26 a plurality of spaced parallel plates and the cathodes 28 also a plurality of spaced parallel plates, each anodic plate extending between and being spaced about 5 inches from a pair of adjacent cathodic plates. The use of a plurality of plates makes it possible to attain a high degree of regeneration efficiency using lower voltage since the conductivity of the solution is relatively low.

The use of porous electrodes as shown in FIG. 1 is preferred over the use of solid plates as shown in FIG. 2. With solid plates, the products at the anode can reach the cathode. Thus, if the ferrous ion loses an electron at the anode, it becomes ferric and if the ferric ion reaches the cathode it does not necessarily become reduced all the way to metallic iron but rather could be converted to the ferrous ion. Thus, the process begins to lose its efficiency in reducing the concentration of the ferrous ions. On the other hand, when the solution passes through the anode and out the return pipe 23, the formation of ferrous ions from ferric ions at the cathode is avoided because the anode products are prevented from reaching the cathode. Actually, the presence of ferric ions in the regenerated solution is desirable as these ions increase the etching and hence the cleaning power of the solution. Also, at the end of the regeneration process, the solution is primarily ferric citrate which can be used, as such, to remove radioactive contaminants from ferrous metals.

While preferred embodiments of the invention have here been shown and described, it will be understood that skilled artisans may make variations without departing from the spirit of the invention and the scope of the claims. Thus, the process may be carried out batchwise or continuously. In the latter case, this can be accomplished by adjusting the voltage across the electrodes relative to the tank size and flow rate of the solution, which must be equal to or greater than the ferrous ion mobility which is approximately 0.0005 cm./sec. Also, to extend the life of the electrolytically regenerated solutions and increase the overall efficiency of the process, the pH of the solution can be adjusted to 2–6 and the concentration of the citrate ions can be augmented by the addition of small amounts of citric acid and water.

I claim:

1. In the process of cleaning ferrous metals to remove oxide deposits therefrom with aqueous solutions of organic acids selected from the class consisting essentially of citric and tartaric acids, the step of regenerating the solution after exposure to the oxide deposits by electrolyzing the solution to plate out ferrous ions at the cathode, and recycling the regenerated solution for further use in removing oxide deposits.

2. In the process of cleaning ferrous metals to remove oxide deposits therefrom with aqueous solutions of organic acids selected from the class consisting essentially of citric and tartaric acids, the step of regenerating the solution after exposure to the oxide deposits by electrolyzing the solution using a plurality of spaced electrodes to plate out ferrous ions at the cathodes, and returning the regenerated solution for further use in removing oxide deposits.

3. In the process of cleaning ferrous metals to remove oxide deposits therefrom with aqueous solutions of organic acids selected from the class consisting essentially of citric and tartaric acids, the step of regenerating the solution after exposure to the oxide deposits by electrolyzing the solution using concentrically arranged porous electrodes to plate out ferrous ions at the cathode, and reusing the regenerated solution for removing oxide deposits.

4. In the process of cleaning ferrous metals to remove oxide deposits therefrom with aqueous solutions of organic acids selected from the class consisting essentially of citric and tartaric acids, the step of regenerating the solution after exposure to the oxide deposits by electrolyzing the solution using electrodes spaced apart about 5 inches and a current density of 2–50 a.s.f. to plate out ferrous ions at the cathode, and reusing the regenerated solution for removing oxide deposits.

5. In the process of cleaning ferrous metals to remove oxide deposits therefrom with aqueous solutions of organic acids selected from the class consisting essentially of citric and tartaric acids, the step of regenerating the solution after exposure to the oxide deposits by electrolyzing the solution using electrodes spaced apart about 5 inches and a current density of 15–30 a.s.f. to plate out ferrous ions at the cathode, and reusing the regenerated solution for removing oxide deposits.

6. A process of cleaning ferrous metals to remove oxide deposits therefrom comprising immersing the metal in a cleaning zone containing an aqueous solution of organic acids selected from the class consisting essentially of citric and tartaric acids, delivering the solution containing combined and uncombined ferrous ions stripped from the oxides to a regenerating zone, electrolyzing the solution in the regenerating zone to plate out the ferrous ions on the cathode, and returning the regenerated solution to the cleaning zone.

7. A process of cleaning ferrous metals to remove oxide deposits therefrom comprising immersing the metal in a cleaning zone containing an aqueous solution of organic acids selected from the class consisting essentially of citric and tartaric acids, delivering the solution containing combined and uncombined ferrous ions stripped from the oxides to a regenerating zone, electrolyzing the solution in the regenerating zone employing concentrically arranged hollow porous anodes and cathodes to plate out the ferrous ions on the cathode, and withdrawing the regenerated solution from the interior of the anode and returning it to the cleaning zone thereby preventing the anode products from reaching the cathode.

8. The process of claim 7 in which the cathode and anode are spaced about 5 inches apart and a current density of 15–30 a.s.f. is used.

9. A process of cleaning ferrous metals to remove oxide deposits therefrom comprising immersing the metal in a cleaning zone containing an aqueous solution of organic acids selected from the class consisting essentially of citric and tartaric acids, delivering the solution containing combined and uncombined ferrous ions stripped from the oxides to a regenerating zone, electrolyzing the solution in the regeneration zone employing an inner hollow porous anode and an outer concentric hollow porous cathode spaced apart about 5 inches and a current density of 15–30 a.s.f. to plate out ferrous ions on the cathode, withdrawing the regenerated solution from the interior of the anode and returning it to the cleaning zone thereby preventing the anode products from reaching the cathode.

10. A process of cleaning ferrous metals to remove oxide deposits therefrom comprising immersing the metal in a cleaning zone containing an aqueous solution of organic acids selected from the class consisting essentially of citric and tartaric acids, delivering the solution containing combined and uncombined ferrous ions stripped from the oxides to a regenerating zone, electrolyzing the solution in the regeneration zone employing an inner hollow porous anode made of platinum plated titanium and an outer concentric hollow porous cathode made of nitric acid-passivated steel spaced apart about 5 inches and a current density of 15–30 a.s.f. to plate out ferrous ions on the cathode, withdrawing the regenerated solution from the interior of the anode and returning it to the cleaning zone thereby preventing the anode products from reaching the cathode.

11. For use in a process of cleaning ferrous metals to remove oxide deposits therefrom, a process of regenerating an aqueous solution of an organic acid selected from the class consisting of citric and tartaric acids containing combined and uncombined ferrous ions as contaminants comprising electrolyzing the solution to plate out iron on the cathode.

References Cited

UNITED STATES PATENTS

| 1,524,448 | 1/1925 | Murphy | 204—145 |
| 1,598,731 | 9/1926 | Lee | 204—145 |
| 1,695,430 | 12/1928 | Klinger | 204—145 |
| 2,583,098 | 1/1952 | Heise et al. | 204—112 |
| 2,865,823 | 12/1958 | Harris et al. | 204—238 |

JOHN H. MACK, *Primary Examiner.*

HOWARD M. FLOURNOY, *Assistant Examiner.*